US011938612B2

(12) United States Patent
Eto et al.

(10) Patent No.: US 11,938,612 B2
(45) Date of Patent: Mar. 26, 2024

(54) SIDE HANDLE FOR POWER TOOL AND POWER TOOL

(71) Applicant: MAKITA CORPORATION, Anjo (JP)

(72) Inventors: Yu Eto, Anjo (JP); Norikazu Baba, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/863,666

(22) Filed: Jul. 13, 2022

(65) Prior Publication Data

US 2023/0061232 A1 Mar. 2, 2023

(30) Foreign Application Priority Data

Aug. 26, 2021 (JP) ................................ 2021-138297

(51) Int. Cl.
*B25G 1/00* (2006.01)
*B25F 5/02* (2006.01)

(52) U.S. Cl.
CPC .................................... *B25F 5/026* (2013.01)

(58) Field of Classification Search
CPC .......... Y10S 16/90; B25F 5/024; B25F 5/026; B25F 5/02; B25F 5/006; B24B 23/00; B24B 23/005; B24B 29/00; B27B 9/00; B25G 1/06; B25G 1/00; B25G 3/38; B25G 16/426
See application file for complete search history.

(56) References Cited

U.S. PATENT DOCUMENTS 5,687,483 A * 11/1997 Neubert ................. B23D 51/01 30/340
5,694,818 A * 12/1997 Nickipuck ............ B25B 13/461 81/177.8
6,266,850 B1 * 7/2001 Williams ................ B25F 5/026 403/97
6,725,491 B2 * 4/2004 Hung .................... B24B 23/005 15/97.1
7,631,575 B2 * 12/2009 Gard ....................... F16C 11/10 74/530
2007/0163067 A1 * 7/2007 Huang .................. E04F 21/163 15/235.4
2009/0178520 A1 * 7/2009 Engelfried ............. B25F 5/026 81/489
2017/0265426 A1 * 9/2017 Nelson ................. A01K 1/0125
(Continued)

FOREIGN PATENT DOCUMENTS

CN 102145486 B * 12/2014 .............. B25F 5/026
CN 212020654 U * 11/2020
DE 3921752 A * 1/1991 ........... B24B 23/005
(Continued)

*Primary Examiner* — Chuck Y Mah
(74) *Attorney, Agent, or Firm* — Oliff PLC

(57) ABSTRACT

A side handle can be toollessly positioned on a tool body, and is attachable to power tools of multiple models and is highly versatile. A side handle is attachable to a side surface of a tool body included in a power tool. The side handle includes a rotation locking member attachable to the tool body in a manner of being restricted from rotating, and an operable portion operable to lock and unlock a position of the side handle relative to the rotation locking member.

5 Claims, 12 Drawing Sheets

(56) References Cited

U.S. PATENT DOCUMENTS

| | | | | |
|---|---|---|---|---|
| 2019/0364842 | A1* | 12/2019 | Nelson | F16C 11/10 |
| 2020/0180124 | A1* | 6/2020 | Ellice | B25F 5/026 |

FOREIGN PATENT DOCUMENTS

| | | | | | |
|---|---|---|---|---|---|
| EP | 3395500 | A1 | * | 10/2018 | B24B 23/005 |
| GB | 2124536 | A | * | 2/1984 | B25D 17/04 |
| JP | 2004261052 | A | * | 9/2004 | |
| WO | 01/19228 | A1 | | 3/2001 | |

* cited by examiner

SIDE HANDLE FOR POWER TOOL AND POWER TOOL

CROSS-REFERENCE TO RELATED APPLICATIONS

This application claims the benefit of priority to Japanese Patent Application No. 2021-138297, filed on Aug. 26, 2021, the entire contents of which are hereby incorporated by reference.

BACKGROUND

1. Technical Field

The present disclosure relates to a side handle for a power tool (hereafter simply, a side handle) that is attachable to a power tool, such as a polisher or a grinder, and also to a power tool to which a side handle is attached.

2. Description of the Background

A power tool such as a polisher or a grinder includes a side handle grippable by an operator. The side handle is attached to the side surfaces of the tool body. For example, WO 2001/19228 describes a power tool to which the left and right ends of a looped side handle are attached to the left and right side surfaces of the tool body in a rotatable manner with screws. The side handle includes lock knobs that each are rotatable to a locking position to lock the end of the side handle onto the tool body and to a release position to unlock the end of the side handle. The angle of the side handle can be adjusted by rotating the lock knob to the release position. The angle of the side handle can be fixed by rotating the lock knob to the locking position.

BRIEF SUMMARY

Known side handles allow angle adjustment (positioning) without the use of a screwdriver or another tool. However, such a side handle is to be attached to a dedicated mount on the tool body and is thus less versatile.

One or more aspects of the present disclosure are directed to a highly versatile side handle that is attachable to power tools of multiple models and can be toollessly positioned on the tool body.

A first aspect of the present disclosure provides a side handle for a power tool, the side handle being attachable to a side surface of a tool body included in the power tool, the side handle including:

- a rotation locking member attachable to the tool body in a manner of being restricted from rotating; and
- an operable portion operable to lock and unlock a position of the side handle relative to the rotation locking member.

A second aspect of the present disclosure provides a power tool, comprising:

- a tool body; and
- the side handle being attachable to a side surface of the tool body.

The side handle according to the above aspects of the present disclosure can be toollessly positioned on the tool body, and is attachable to power tools of multiple models and is highly versatile.

DETAILED DESCRIPTION

First Embodiment

Embodiments of the present disclosure will now be described with reference to the drawings.

Figure 1:
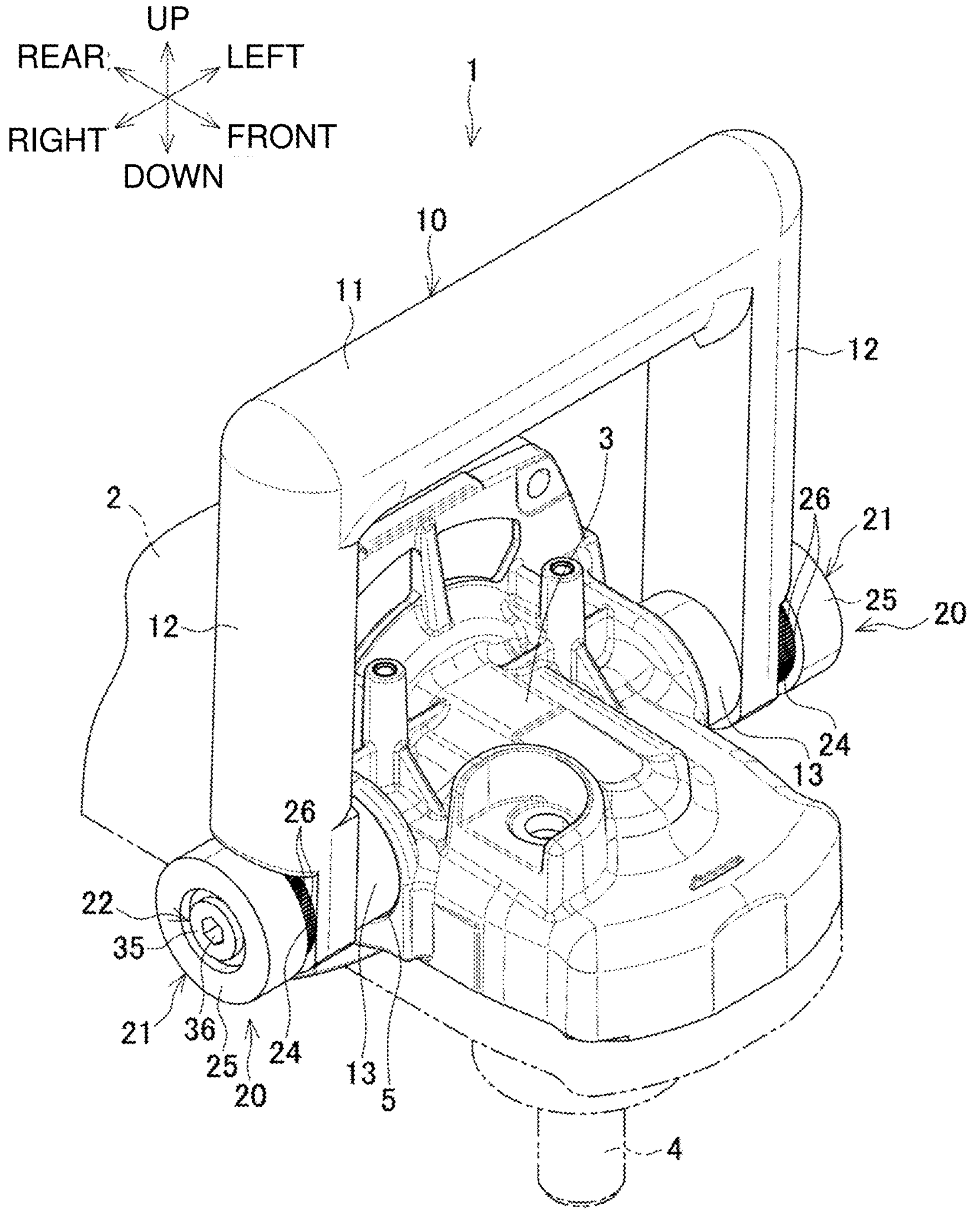
FIG. 1 is a partial perspective view of a polisher according to a first embodiment.
Figure 2:
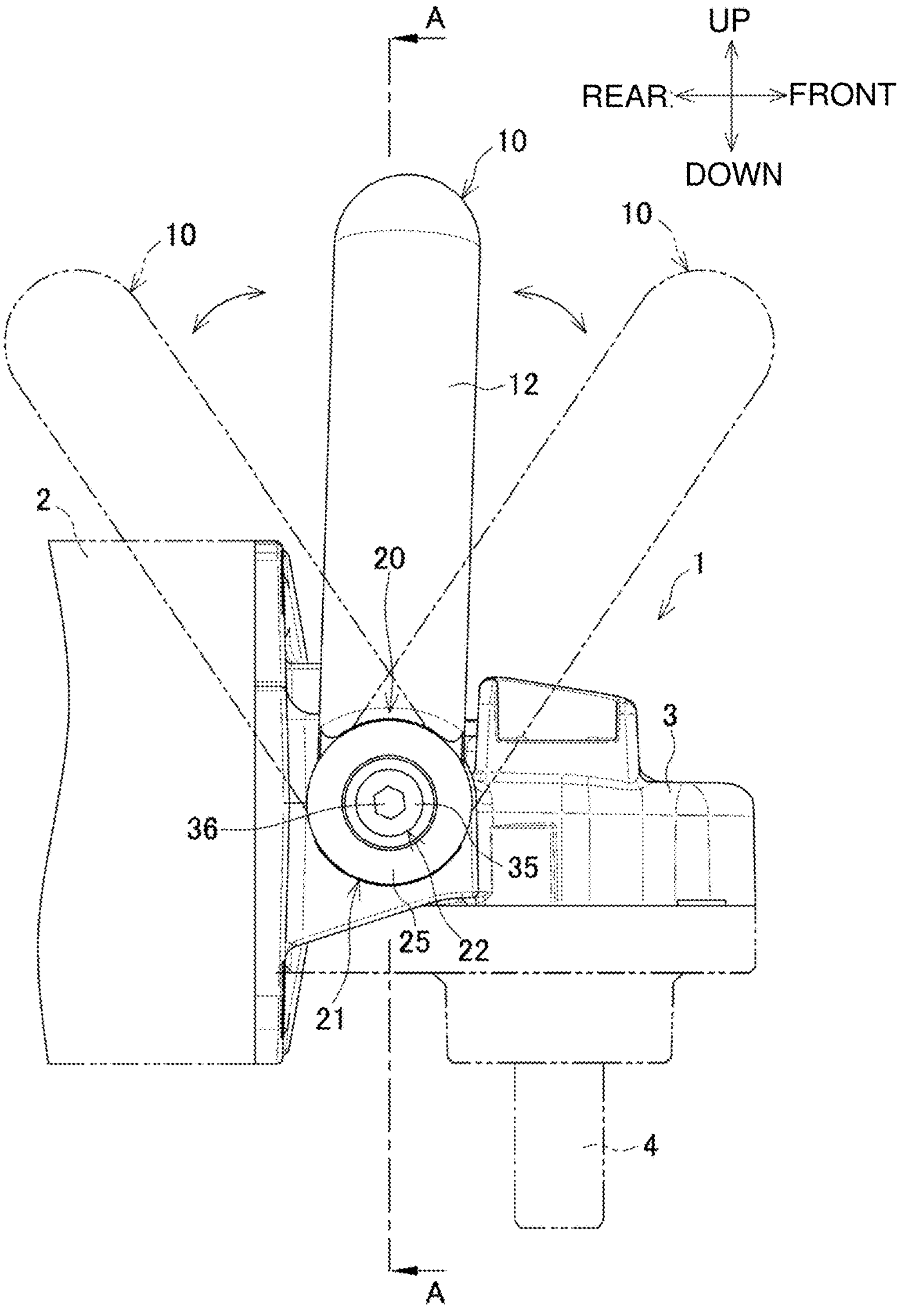
FIG. 2 is a partial side view of the polisher according to the first embodiment.
Figure 3:
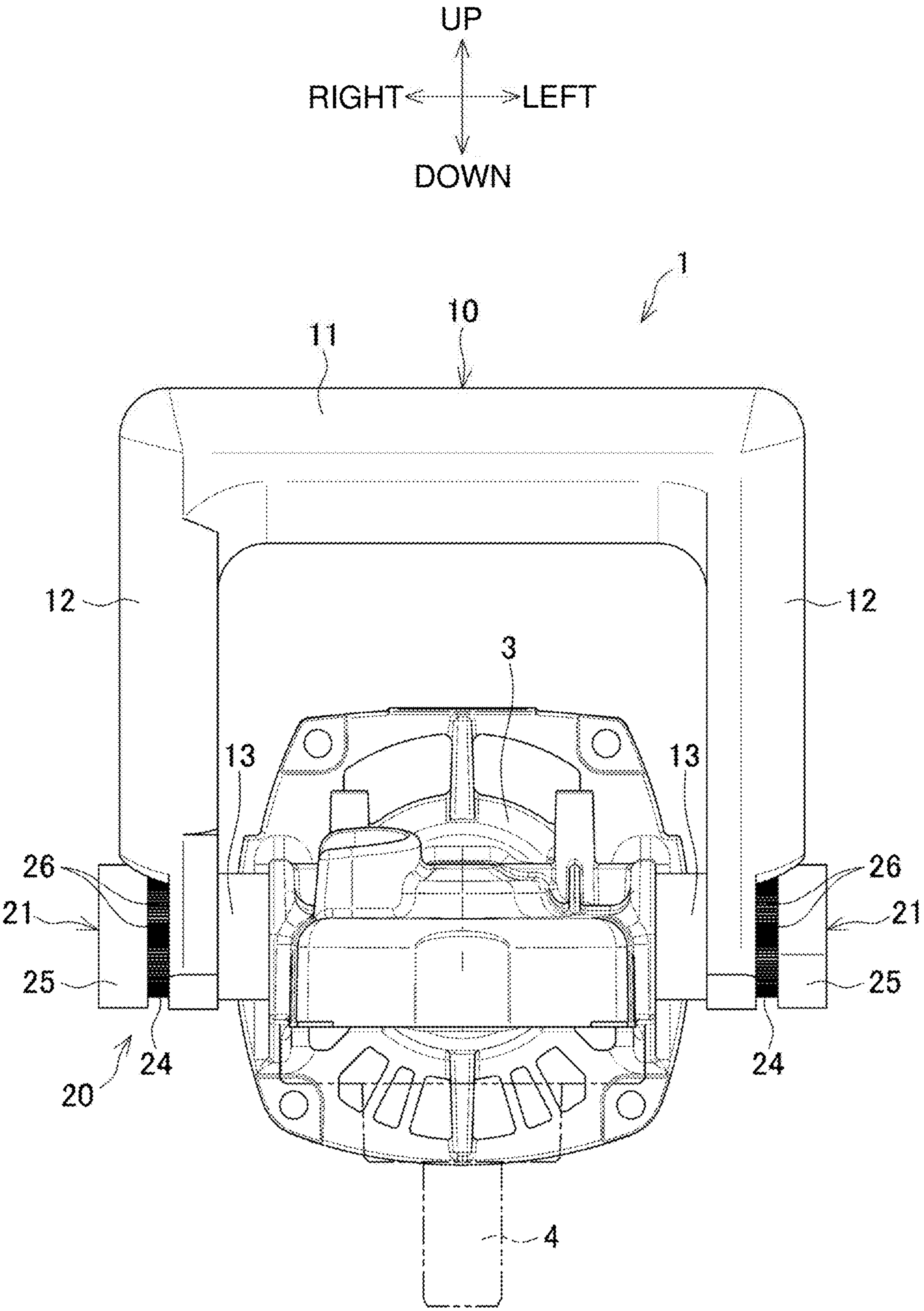
FIG. 3 is a partial front view of the polisher according to the first embodiment.

FIG. 1 is a partial perspective view of a polisher 1 as an example of a power tool to which a side handle is attached. FIG. 2 is a partial side view of the polisher 1. FIG. 3 is a partial front view of the polisher 1

The polisher 1 includes a motor housing 2 extending in the front-rear direction. The motor housing 2 accommodates a motor (not shown). The motor housing 2 includes a front portion joined to a gear housing 3. A spindle 4 protrudes downward from the gear housing 3. A disk-shaped tool (e.g., a pad) is orthogonally attachable to a lower end of the spindle 4. The motor housing 2 has a rear portion to which a power cable (not shown) is connected.

Figure 4:
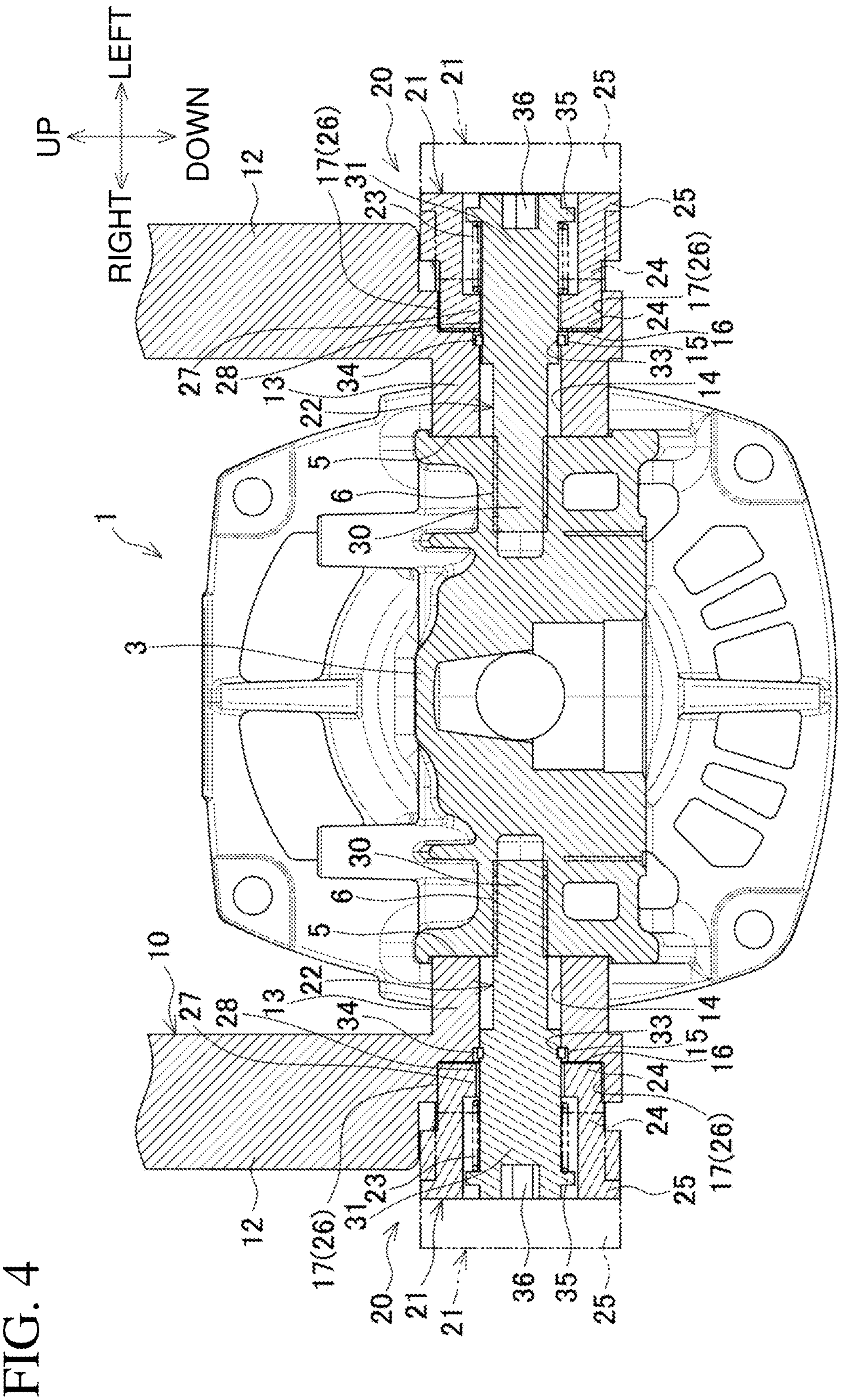
FIG. 4 is a cross-sectional view taken along line A-A in FIG. 2.
Figure 5:
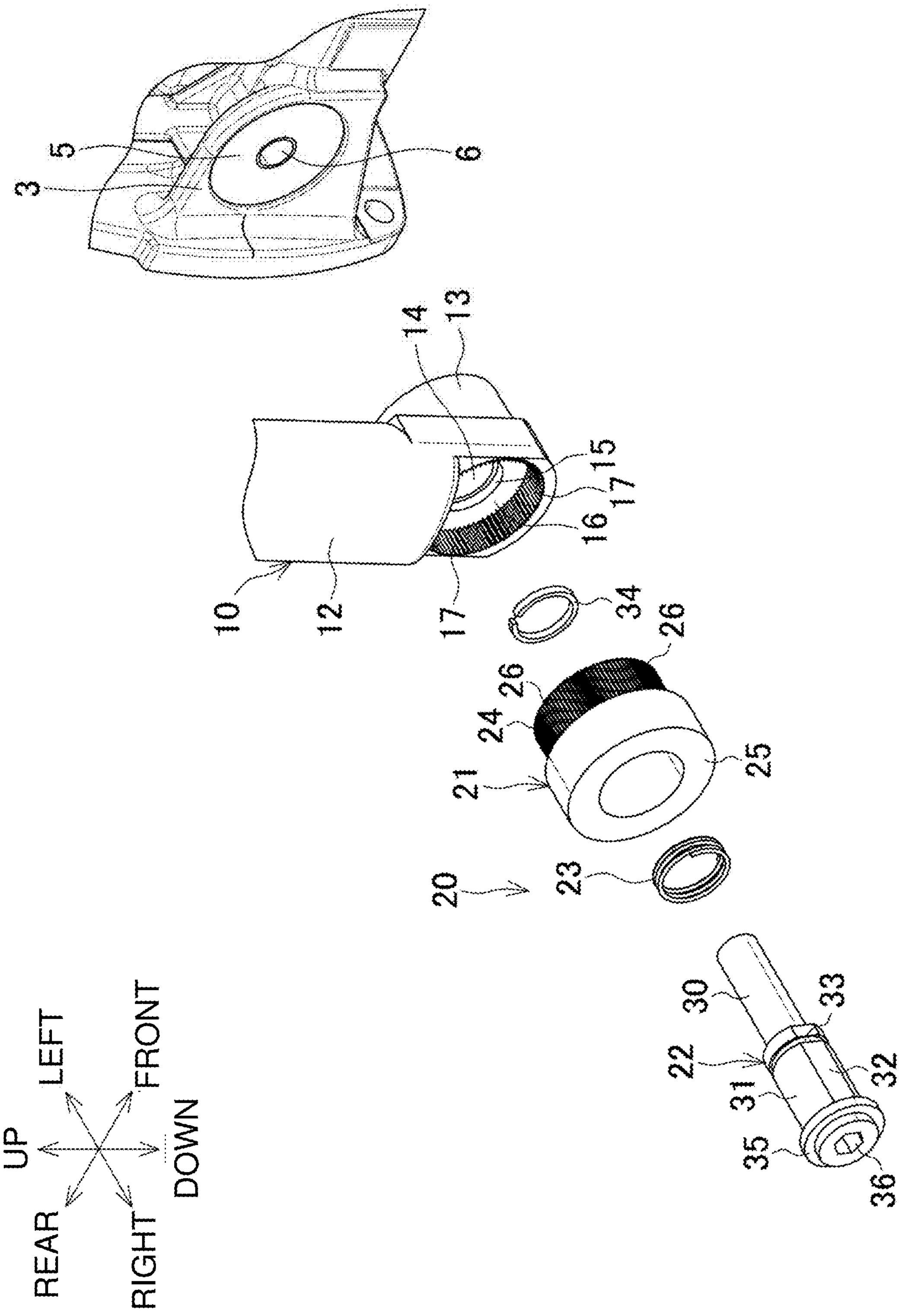
FIG. 5 is an exploded perspective view of an operable portion as viewed from the right.

As shown in FIGS. 4 and 5, mounts 5 to receive a side handle 10 are located on the left and right side surfaces of the gear housing 3. Each mount 5 is a recess that is circular as viewed laterally. Each mount 5 has, at the center, a threaded hole 6 extending in the lateral direction.

The side handle 10 is attachable to and detachable from the mounts 5. The side handle 10 is U-shaped as viewed from the front and is formed from resin. The side handle 10 includes a grip 11 and a pair of arms 12. The grip 11 extends in the lateral direction. The pair of arms 12 extend downward from the left and right ends of the grip 11. Each arm 12 has a lower end with a cylindrical portion 13. The cylindrical portions 13 are coaxial with each other. Each cylindrical portion 13 has a center hole 14 and an intermediate hole 15 laterally outside the center hole 14. The intermediate hole 15 has a slightly larger diameter than the center hole 14 and is coaxial with the center hole 14. Each cylindrical portion 13 has a stepped hole 16 with the largest diameter laterally outside the intermediate hole 15. The stepped hole 16 is coaxial with the intermediate hole 15. Each stepped hole 16 includes multiple spline teeth 17 on its inner circumferential surface. The spline teeth 17 extend in the axial direction. The multiple spline teeth 17 are located at equal intervals in the circumferential direction.

An operable portion 20 is located on each cylindrical portion 13. Each operable portion 20 is attachable to and detachable from the corresponding mount 5. Each operable portion 20 being attached to the mount 5 allows angle adjustment. The left and right operable portions 20 are symmetrical to each other. The right operable portion 20 will be described.

Figure 6:
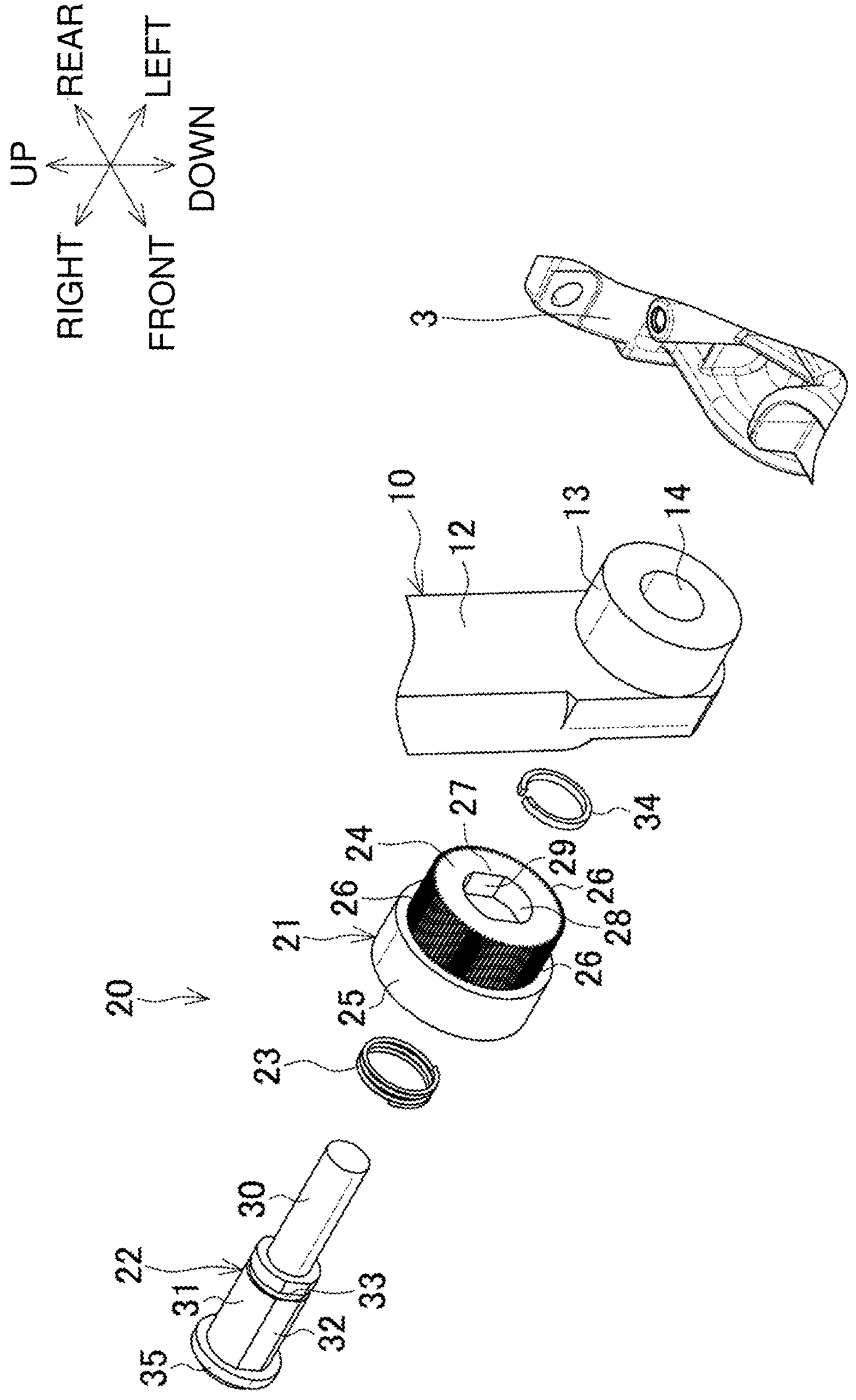
FIG. 6 is an exploded perspective view of the operable portion as viewed from the left.

As shown in FIGS. 4 to 6, the operable portion 20 includes an operation knob 21, a connector bolt 22, and a coil spring 23.

The operation knob 21 is a cylindrical member that is circular as viewed laterally. The operation knob 21 includes a smaller-diameter portion 24 on the left and a larger-diameter portion 25 on the right. The smaller-diameter portion 24 has an outer diameter that allows fitting into the stepped hole 16 of the cylindrical portion 13 from the right. The smaller-diameter portion 24 is axially longer than the stepped hole 16.

The smaller-diameter portion 24 includes multiple spline teeth 26 on its outer circumferential surface. The spline teeth 26 extend in the axial direction. The multiple spline teeth 26 are located at equal intervals in the circumferential direction. An annular wall 27 is located at the inner circumference of the smaller-diameter portion 24. The wall 27 has a through-hole 28 at the center. The through-hole 28 includes a pair of flat edges 29. The smaller-diameter portion 24 has a left end that can be placed into and out of the stepped hole 16. With the smaller-diameter portion 24 placed in the stepped hole 16, the spline teeth 17 and 26 mesh with each other and are integral with the cylindrical portion 13 in the rotation direction.

The connector bolt 22 has a threaded portion 30 on its left end. With the connector bolt 22 placed through the operation knob 21 and the cylindrical portion 13 from the right, the threaded portion 30 is screwed into the threaded hole 6 in the mount 5. A rotation locking portion 31 with a larger diameter than the threaded portion 30 is located coaxially on the right of the threaded portion 30. The rotation locking portion 31 has a pair of flat edges 32 on its outer circumferential surface. The rotation locking portion 31 extends through the through-hole 28 of the operation knob 21. With the flat edges 29 and 32 being fitted with each other, the rotation locking portion 31 is integral with the operation knob 21 in the rotation direction. The rotation locking portion 31 has an annular groove 33 adjacent to its left end. The groove 33 receives a C-shaped stopper 34 externally mounted in it. The stopper 34 is engageable from the right in the intermediate hole 15 of the cylindrical portion 13.

Ahead 35 is located on the right of the rotation locking portion 31. The head 35 has a larger diameter than the rotation locking portion 31. The head 35 has a hexagon socket 36 at the center of its right end surface.

The coil spring 23 is externally mounted on the rotation locking portion 31 inside the operation knob 21. The coil spring 23 has its left end in contact with the wall 27 of the operation knob 21, and has its right end in contact with the head 35 of the connector bolt 22.

In the side handle 10 and the polisher 1 according to the present embodiment, the left and right operable portions 20 include the connector bolts 22 each having the coil spring 23 and the stopper 34 externally mounted on the connector bolt 22. The connector bolt 22 is placed through the operation knob 21 and the cylindrical portion 13 in this order as described above. The threaded portion 30 protruding from the cylindrical portion 13 is then screwed into the threaded hole 6 in the mount 5. The stopper 34 externally mounted on the rotation locking portion 31 then engages with the intermediate hole 15 of the cylindrical portion 13 and causes the left side surface of the cylindrical portion 13 to be in contact with the mount 5.

Each operation knob 21 is urged by the coil spring 23 to an inner sliding position at which the smaller-diameter portion 24 is placed into the stepped hole 16 and the spline teeth 17 and 26 mesh with each other. Each operation knob 21 fitted on the rotation locking portion 31 is locked and cannot rotate, and thus restricts the corresponding cylindrical portion 13 from rotating. This locks the rotation of the side handle 10.

To adjust the angle of the side handle 10, the larger-diameter portions 25 of the left and right operable portions 20 are first gripped, and the operation knobs 21 are pulled against the urge from the coil springs 23 to outer sliding positions at which the smaller-diameter portions 24 are disengaged from the stepped holes 16, as indicated by two-dot chain lines in FIG. 4. This causes each operation knob 21 to release its restriction on the rotation of the cylindrical portion 13. The side handle 10 can thus be pivotable in the front-rear direction as indicated by the two-dot chain lines in FIG. 2. Once the angle is determined and the pull of each operation knob 21 is released, the operation knob 21 returns to the inner sliding position at which the operation knob 21 is placed into the corresponding stepped hole 16 as being urged by the corresponding coil spring 23. This locks the rotation of the side handle 10 again.

However, when one of the left and right operation knobs 21 is pulled to release the restriction on the rotation of the corresponding one of the cylindrical portions 13, the other cylindrical portion 13 remains restricted from rotating. The rotation of the side handle 10 thus remains locked.

The side handle 10 can be detached from the gear housing 3 by removing the threaded portions 30 of the left and right connector bolts 22 from the threaded holes 6. For the side handle 10 with its left and right orientation being reversed, the side handle 10 is attachable to and detachable from the gear housing 3 in the same manner. The side handle 10 can be attached to and detached from power tools of other models (including power tools other than polishers) including the tool body with a pair of left and right threaded holes.

The side handle 10 and the polisher 1 according to the first embodiment include operation knobs 21 (rotation locking members) attachable to the gear housing 3 (tool body) in a manner of being restricted from rotating, and operable portions 20 that can each lock and unlock the angle (position) relative to the operation knob 21.

In this structure, the side handle 10 can be attached to the gear housing 3 including the mounts 5 for the connector bolts 22 and can be positioned by adjusting the angles relative to the operation knobs 21 with the operable portions 20. This structure allows toolless angle adjustment of the side handle 10 with the gear housing 3. The side handle 10 is also attachable to power tools of multiple models and is highly versatile.

In particular, the side handle 10 includes the connector bolts 22 (mounting members) attachable to the gear housing 3. The side handle 10 is pivotable about the connector bolts 22. The operation knobs 21 are attached to the connector bolts 22 in a manner of being restricted from rotating relative to the connector bolts 22.

The connector bolts 22 that allow attachment to the gear housing 3 can be used to prevent rotation with the operation knobs 21.

Each operation knob 21 includes spline teeth 26 (engagement portion) that can engage in the direction of relative rotation.

This structure easily prevents rotation with the operation knobs 21.

Each operation knob 21 serves as both the rotation locking member and the operable portion 20.

This structure reduces the number of components and allows the angle adjustment to be performed easily by an operation on each operation knob 21.

Each operation knob 21 is movable between the inner sliding position (locking position to lock relative rotation) and the outer sliding position (unlocking position to unlock relative rotation). The operable portion 20 includes a coil spring 23 (urging member) that urges the operation knob 21 to the inner sliding position. When the operation knob 21 is moved to the outer sliding position against the urge from the coil spring 23, the side handle 10 can be rotated relative to the operation knob 21. When the moving operation is stopped, the operation knob 21 returns to the inner sliding position and restricts the relative rotation.

Thus, after the angle is changed by releasing the lock of the rotation at the outer sliding position of the operation knob 21, releasing the hand from the operation knob 21 causes the operation knob 21 to automatically return to the inner sliding position to lock the rotation. In this manner, the angle adjustment can be performed with higher operability.

The side handle 10 includes the pair of arms 12 attachable to the left and right side surfaces of the gear housing 3. The pair of operation knobs 21 are located on the left and right of the gear housing 3.

In this structure, the two operation knobs 21 are to be operated at the same time to allow the angle adjustment. This eliminates accidental rotation of the side handle 10 being locked from rotating, and allows more reliable angle adjustment.

For the side handle 10 with its left and right orientation being reversed, the side handle 10 is attachable to the gear housing 3.

This facilitates attachment of the side handle 10.

In the first embodiment, the engagement between the operation knobs and the stepped holes in the side handle in the rotation direction is not limited to the meshing between their spline teeth. The engagement may be achieved as an engagement between one or more ridges and one or more grooves. An engagement protrusion in the radial direction may be located on one of the facing surfaces of the operation knob and the stepped hole, and an engagement recess may be located on the other surface of the operation knob and the stepped hole. The engagement protrusion and the engagement recess may then engage with each other to lock the rotation.

Although the operation knobs each include a protruding portion (smaller-diameter portion) and the side handle includes the corresponding recessed portion (stepped hole) in the first embodiment, the structure may be reversed. More specifically, the side handle may include protruding portions as engagement portions including spline teeth, and the operation knobs may include the corresponding recessed portions as engagement portions including spline teeth, and these portions may engage with each other in the rotation direction.

In the first embodiment, each of the left and right arms includes the operation knob and the operable portion. In some embodiments, one of the left and right arms may include the operation knob and the operable portion. The side handle may not be laterally symmetrical. For example, the side handle may have an L shape as viewed from the front and may include an arm on one side alone attached to the mount.

In the first embodiment, each operation knob is used as both the rotation locking member and the operable portion. In some embodiments, the rotation locking member and an operable member in the operable portion may be separate components. An operation on the operable member may cause the rotation locking member to engage with or disengage from the arm.

The mounting members may not be connector bolts but may be other members such as pins.

Second Embodiment

A second embodiment of the present disclosure will now be described. The components that are the same as in the first embodiment are denoted with the same reference numerals and will not be described repeatedly.

Figure 7:
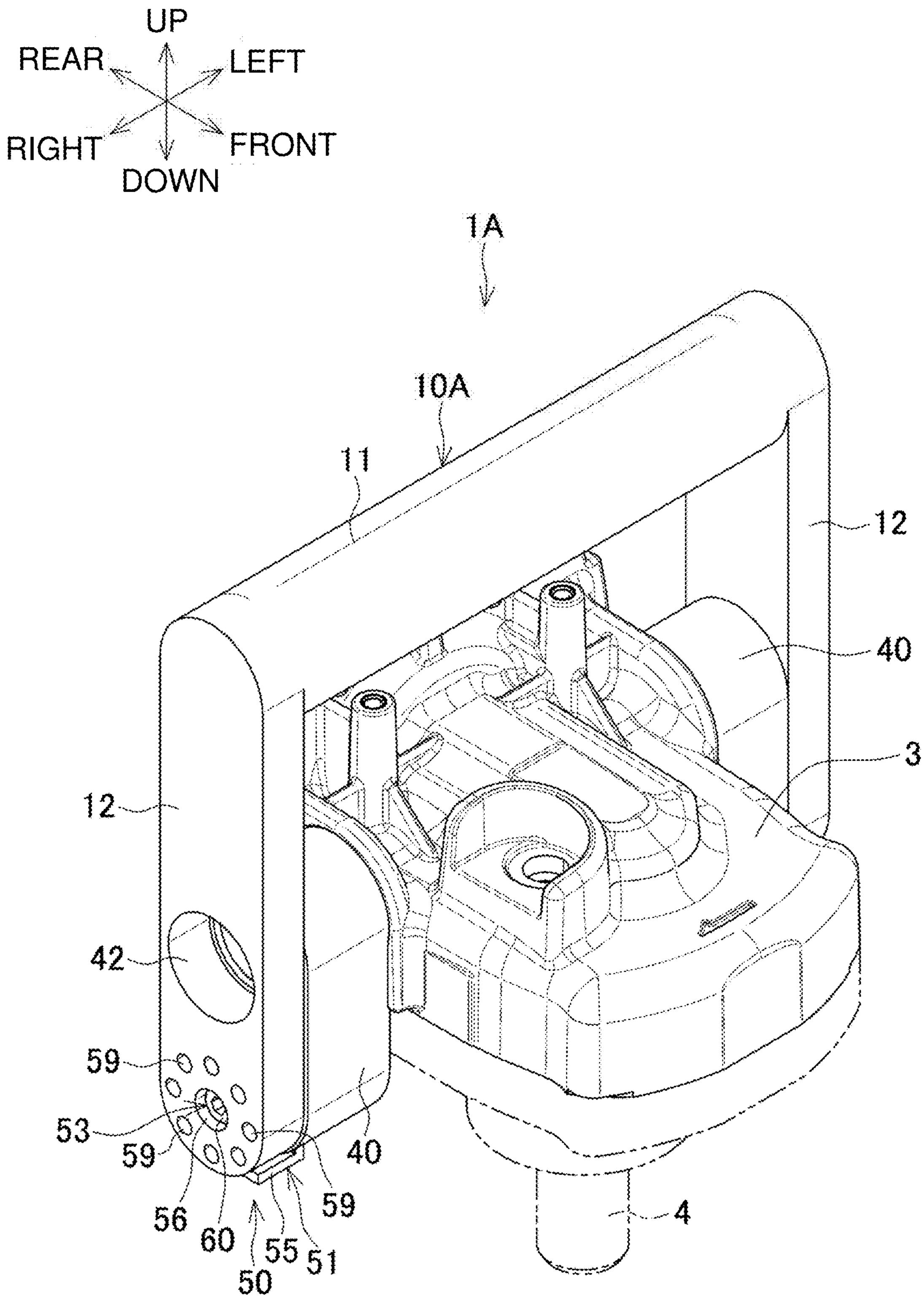
FIG. 7 is a partial perspective view of a polisher according to a second embodiment.
Figure 8:
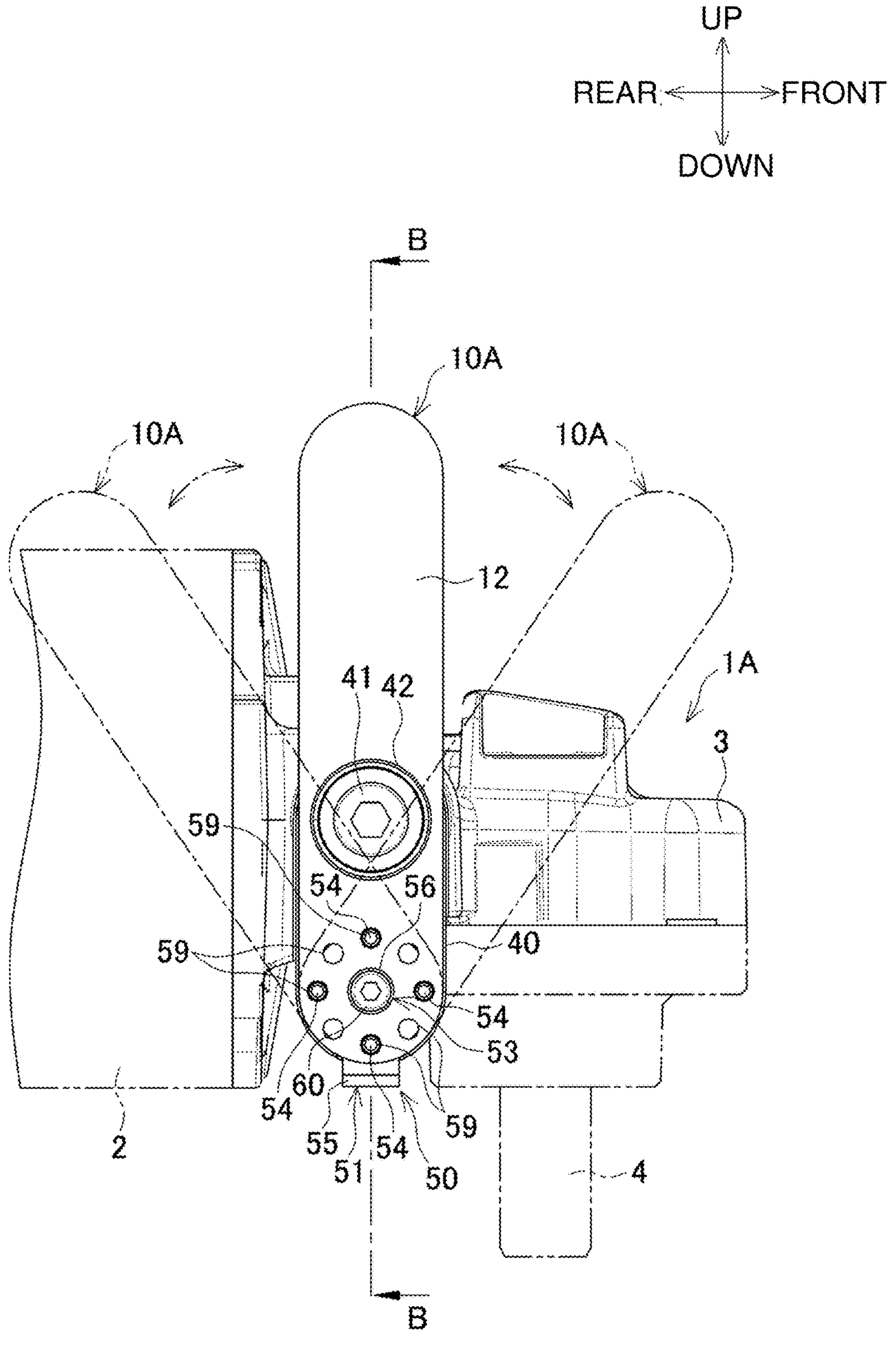
FIG. 8 is a partial side view of the polisher according to the second embodiment.
Figure 9:
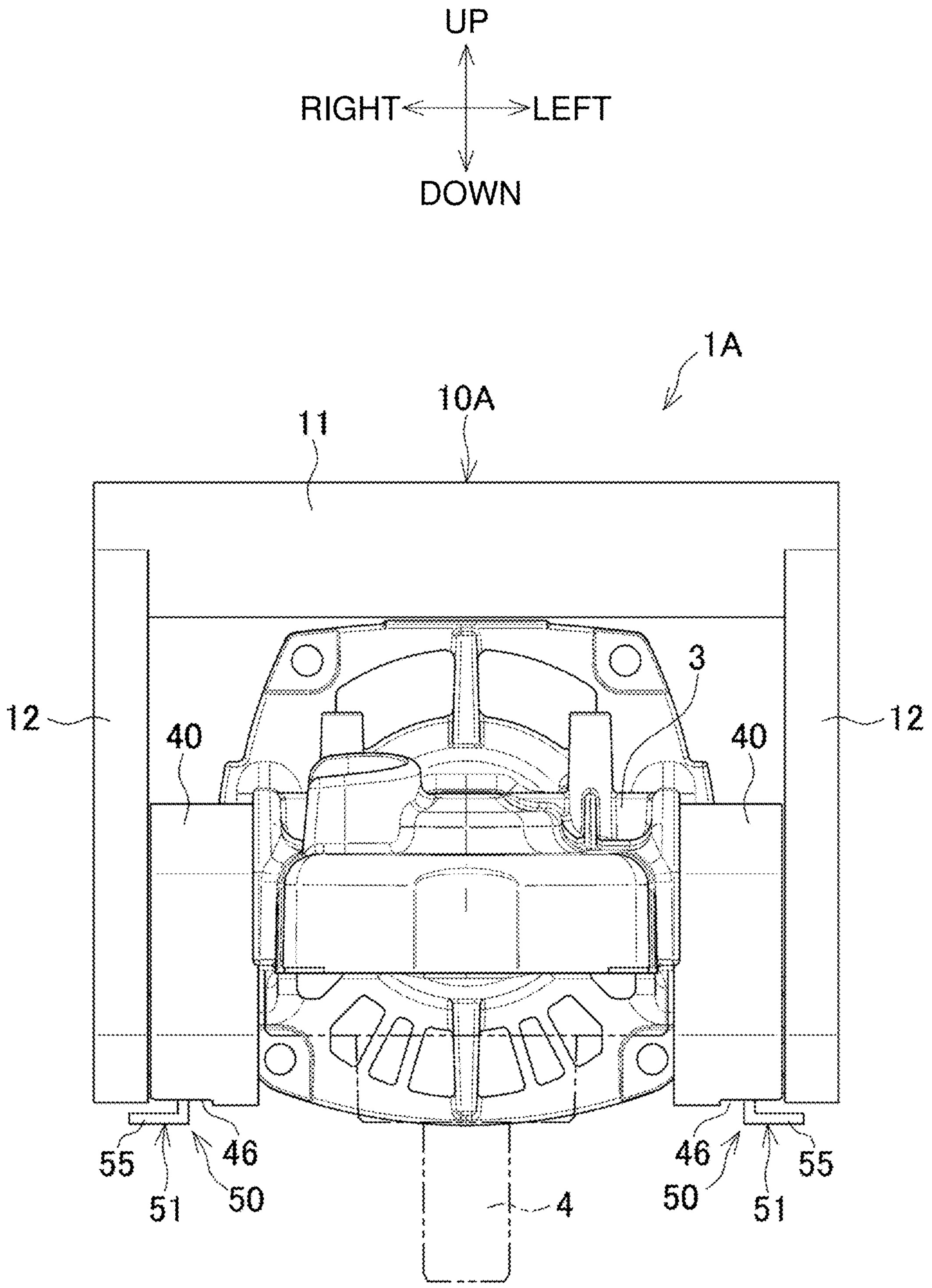
FIG. 9 is a partial front view of the polisher according to the second embodiment.

FIG. 7 is a partial perspective view of a polisher 1A. FIG. 8 is a partial side view of the polisher 1A. FIG. 9 shows a partial front view of the polisher 1A.

Figure 10:
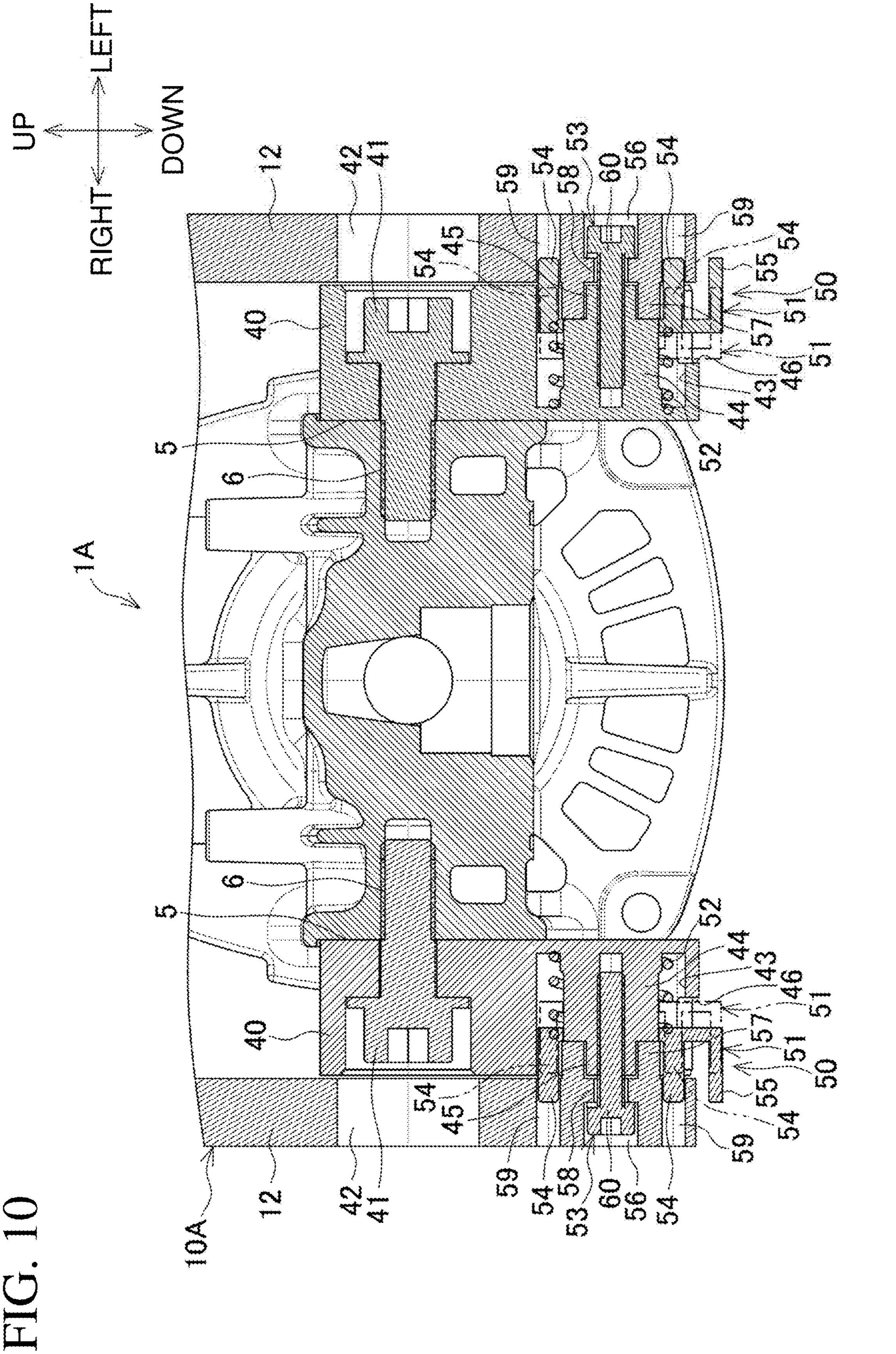
FIG. 10 is a cross-sectional view taken along line B-B in FIG. 8.
Figure 11:
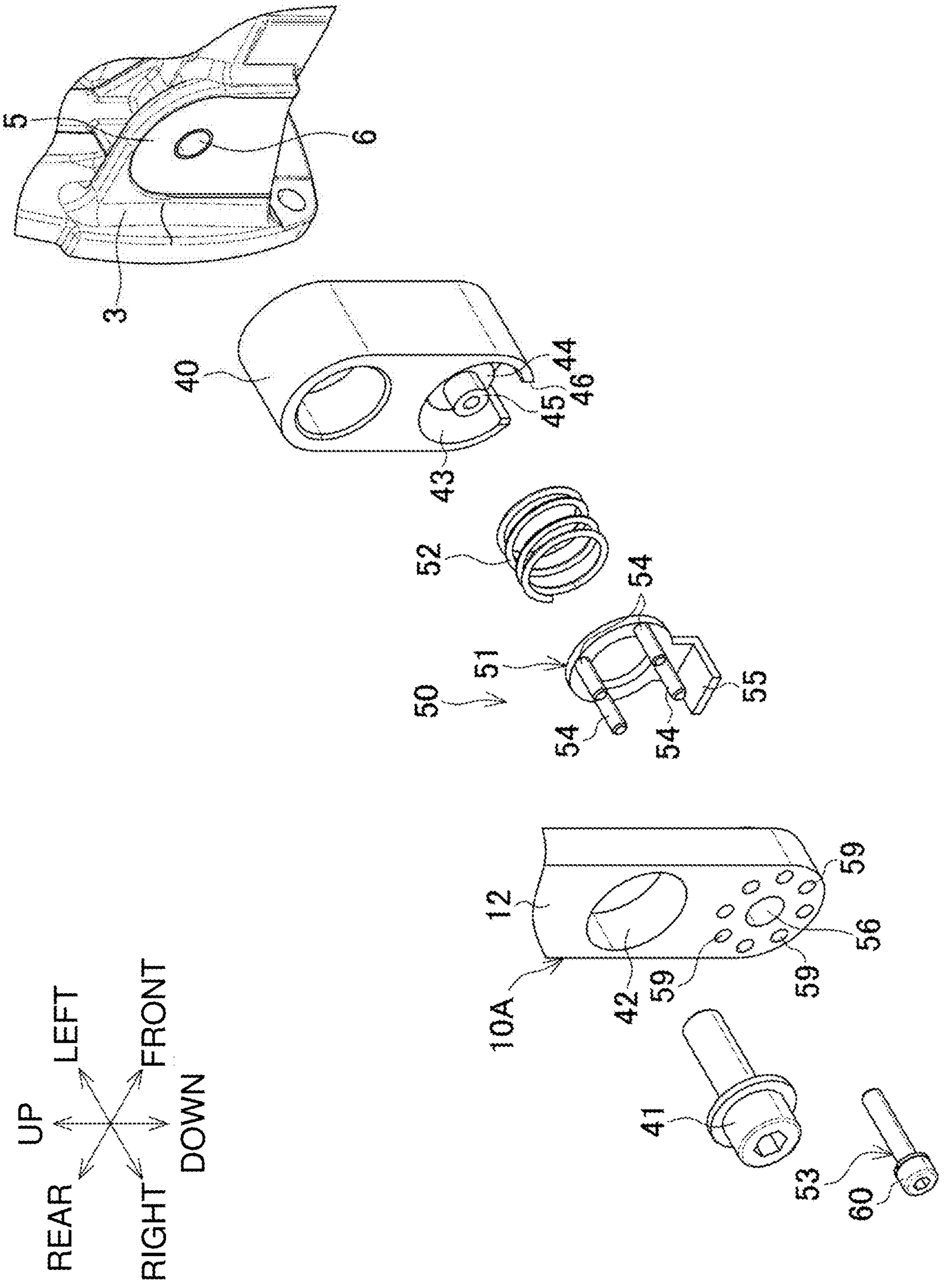
FIG. 11 is an exploded perspective view of the operable portion as viewed from the right.

A side handle 10A includes a pair of rotation locking arms 40 located inside left and right arms 12. As shown in FIGS. 10 and 11, connector bolts 41 are screwed into threaded holes 6 in mounts 5. Each connector bolt 41 is placed through the upper end of the corresponding rotation locking arm 40 from the left or right outside. This fastens the rotation locking arm 40 extending downward from the connector bolt 41. Each arm 12 has a through-hole 42 into which the connector bolt 41 is screwed.

Each rotation locking arm 40 has a blind hole 43 in its lower end. The blind hole 43 defines a circular opening to the left or right outward. Each blind hole 43 receives, on its bottom surface, a screw boss 44 coaxially protruding laterally outward. The outer end of each screw boss 44 is a coaxial smaller-diameter portion 45. Each rotation locking arm 40 has, on its lower surface, a notch 46 extending linearly in the lateral direction to open the blind hole 43 on the lower surface.

Each blind hole 43 receives, through the corresponding operable portion 50, the bottom end of each arm 12 to allow angle adjustment. The left and right operable portions 50 are symmetrical to each other. The right operable portion 50 will be described.

Figure 12:
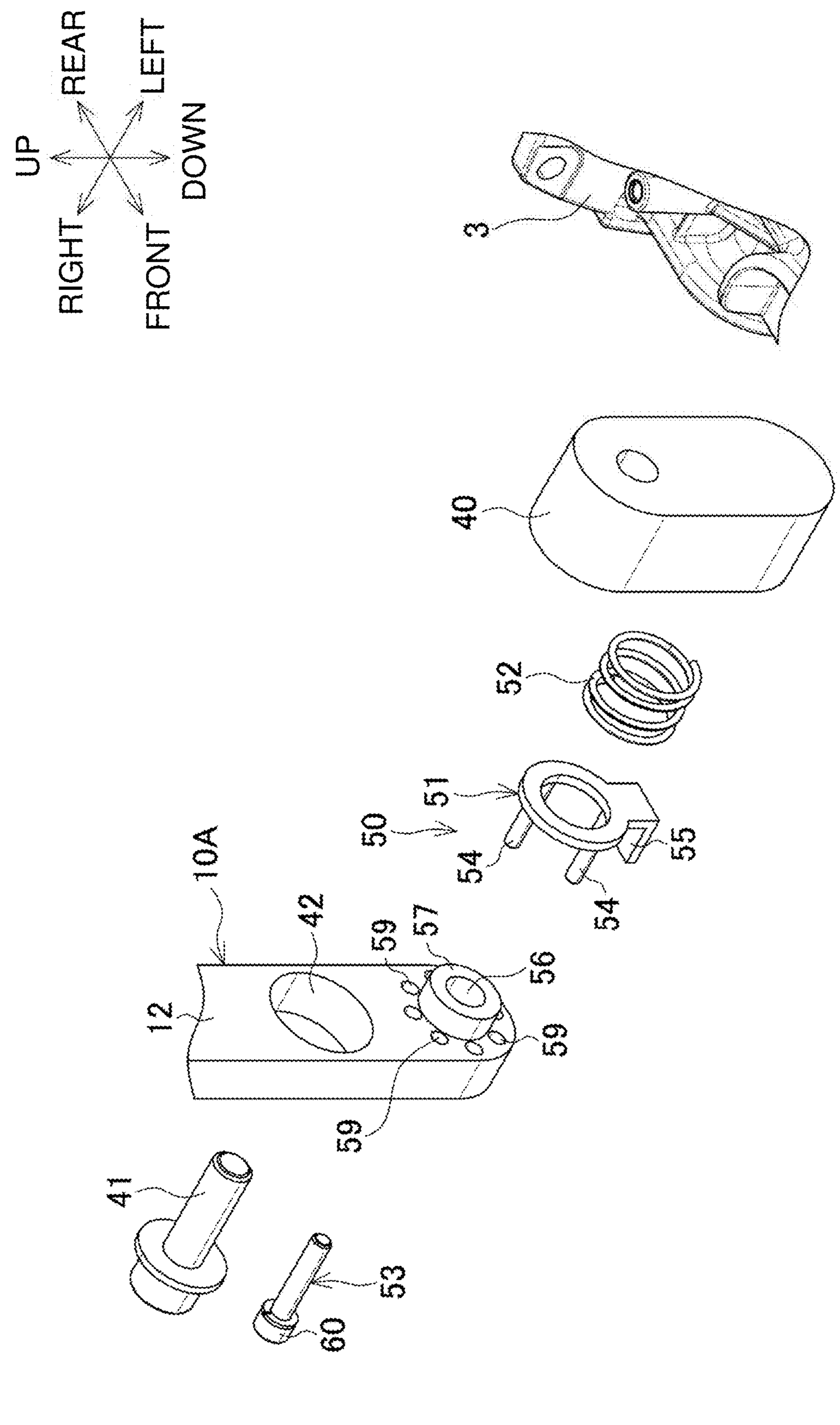
FIG. 12 is an exploded perspective view of the operable portion as viewed from the left.

As shown in FIGS. 10 to 12, each operable portion 50 includes an operable plate 51, a coil spring 52, and a shaft bolt 53.

The operable plate 51 is annular and is orthogonally placed through the screw boss 44 inside the blind hole 43. The operable plate 51 includes four engagement pins 54 on its right side surface. Each engagement pin 54 protrudes rightward. The four engagement pins 54 are arranged at equal intervals along a circle concentric with the center of the operable plate 51.

The operable plate 51 includes an L-shaped operational tab 55 on its lower end as viewed from the front. The operational tab 55 extends downward and then bends to the right. The operational tab 55 protrudes through the notch 46 and downward from the rotation locking arm 40. The operable plate 51 is movable in the lateral direction along the screw boss 44 in a manner of being restricted from rotating inside the blind hole 43 with the operational tab 55.

The coil spring 52 is externally mounted on the screw boss 44 on the left of the operable plate 51. The coil spring 52 has its right end in contact with the operable plate 51, and its left end in contact with the bottom of the blind hole 43. The operable plate 51 is thus urged to the right by the coil spring 52.

Each arm 12 has a through-hole 56 in its lower end. The through-hole 56 is coaxial with the screw boss 44 and extends in the lateral direction. A cylindrical portion 57 is located on the lower end and the left side surface of the arm 12. The cylindrical portion 57 extends with the through-hole 56 at the center, and protrudes leftward. The cylindrical portion 57 has a slightly larger diameter than a screw boss 44. The through-hole 56 can receive the smaller-diameter portion 45 of the screw boss 44. An annular ridge 58 is located on the right of the cylindrical portion 57 inside the through-hole 56. The ridge 58 has an inner diameter smaller than the outer diameter of the smaller-diameter portion 45.

Eight engagement holes 59 are located around the cylindrical portion 57 on the lower end of the arm 12. Each engagement hole 59 extends through the arm 12 in the lateral direction. The multiple engagement holes 59 are located at equal intervals along a circle and centered at the cylindrical portion 57. The engagement pins 54 on the operable plate 51 can be placed into the engagement holes 59 from the left.

The shaft bolt 53 is placed into the through-hole 56 from the right of the arm 12 and is screwed into the screw boss 44 with the smaller-diameter portion 45 placed into the cylindrical portion 57. In this state, a head 60 of the shaft bolt 53 comes in contact with the ridge 58 inside the through-hole 56. Thus, the arm 12 and the rotation locking arm 40 are connected at their lower ends with the shaft bolt 53 to allow rotation relative to each other.

In the side handle 10A according to the present embodiment, the operable plate 51 in each operable portion 50 is urged by the coil spring 52 to the outer sliding position to come in contact with the left side surface of the cylindrical portion 57. In this state, each engagement pin 54 is placed into the engagement hole 59 in the arm 12. Each arm 12 is thus restricted from rotating with the operable plate 51 that is engaged with the rotation locking arm 40 to prevent rotation. This locks the rotation of the side handle 10A.

To adjust the angle of the side handle 10A, the operable plate 51 on each of the left and right operable portions 50 is slid with the operational tab 55 to the inner sliding position at which the engagement pins 54 disengage from the engagement holes 59 as indicated by two-dot chain lines in FIG. 10. This releases the restriction on the rotation of the arm 12 with the operable plate 51. The side handle 10A can thus be pivotable in the front-rear direction about the shaft bolt 53 as indicated by the two-dot chain lines in FIG. 8.

Once the angle is determined and the hand is released from each operational tab 55, the corresponding operable plate 51 returns to the outer sliding position at which the engagement pins 54 are placed into the engagement holes 59 as being urged by the coil spring 52. This locks the rotation of the side handle 10A again. Although the engagement pins 54 may be circumferentially misaligned with the engagement holes 59 and come in contact with the left side surface of the arm 12, the engagement pins 54 returns to the outer sliding position in response to the side handle 10A being simply rotated in the front-rear direction slightly to cause the engagement pins 54 to be circumferentially aligned with the engagement holes 59, allowing the operable plate 51 to automatically move to the outer sliding position.

However, when one operable plate 51 is moved to the inner sliding position with the corresponding left or right operational tab 55 to release the restriction on the rotation of the corresponding one of the arms 12, the other arm 12 remains restricted from rotating. The rotation of the side handle 10A thus remains locked.

The side handle 10A can also be detached from the gear housing 3 by removing the left and right connector bolts 41 from the threaded holes 6. For the side handle 10A with its left and right orientation being reversed, the side handle 10A is attachable to and detachable from the gear housing 3 in the same manner. The side handle 10A is also attachable to and detachable from power tools of other models (including power tools other than polishers) including the tool body with a pair of left and right threaded holes.

The side handle 10A and the polisher 1A according to the second embodiment include rotation locking arms 40 (rotation locking members) attachable to the gear housing 3 in a manner of being restricted from rotating, and operable portions 50 that can each lock the angle relative to the rotation locking arm 40 and release the lock of the angle.

In this structure, the side handle 10A can be attached to the gear housing 3 including the mounts 5 for the rotation locking arms 40 and can be positioned by adjusting the angles of the rotation locking arms 40 with the operable portions 50. This structure allows toolless angle adjustment of the side handle 10A with the gear housing 3. The side handle 10A is also attachable to power tools of multiple models and is highly versatile.

In particular, the side handle 10A includes arms 12 attachable on the side surfaces of the gear housing 3 and includes shaft bolts 53 (rotational shafts) at positions different from the positions at which the rotation locking arms 40 is attached to the gear housing 3. The shaft bolts 53 connect to the arms 12 to allow rotation of the arms 12. The operable portions 50 can lock and unlock the rotation of the arms 12 relative to the shaft bolts 53.

A change in the thickness in the lateral direction and the length of each rotation locking arm 40 in accordance with the dimensions and the shape of the polisher 1A allows other components to be used commonly.

In the second embodiment, each operational tab on the operable plate may not be on the lower end. Each operational tab may be on the front or the rear of the operable plate. The number of engagement pins and their arrangement may also be changed as appropriate.

The engagement holes in the arms may be changed as appropriate for the engagement pins.

In the second embodiment, each operable plate on the rotation locking arm is engaged with or disengaged from the corresponding arm, but the structure may be reversed. For example, an operable plate may be located on the lower end of the arm and a coil spring may be used to urge the arm toward the rotation locking arm, and the rotation locking arm may have engagement holes for the engagement pins on the operable plate to engage with the corresponding arm.

The rotation locking arm may not extend downward from the side surface of the gear housing. The rotation locking arm may be attached to extend frontward, rearward, or upward, or diagonally, as appropriate for the polisher.

In the second embodiment as well, the side handle may not be laterally symmetrical. For example, the side handle may have an L shape as viewed from the front and may include an arm on one side alone attached to the mount with the rotation locking member.

In each of the above embodiments, the side handle may not be U-shaped as viewed from the front. The side handle may be in the shape of a semicircle that is curved laterally and upward. The side handle may be formed entirely from metal or resin.

The positioning of the side handle may be other than angle adjustment. The positioning includes sliding the side handle in a predetermined direction for attaching and fixing the attachment position of the side handle.

The power tool may not operate on alternating current (AC) or may be a direct current (DC) tool including a battery pack as a power supply.

The power tool may not be a polisher. The present disclosure is applicable to other grinding and polishing tools such as polishers and sanders, and cutting tools such as circular saws and cutters. The power tool may not be an electric tool. The present disclosure is also applicable to an air tool or an engine tool.

The side handle may be attached to a component other than the gear housing. The side handle may be attached to a motor housing or another housing.

REFERENCE SIGNS LIST

1, 1A polisher
2 motor housing
3 gear housing
4 spindle
5 mount
6 threaded hole
10, 10A side handle
11 grip
12 arm
13 cylindrical portion
16 stepped hole
17, 26 spline tooth
20, 50 operable portion
21 operation knob
22, 41 connector bolt
23, 52 coil spring
31 rotation locking portion
40 rotation locking arm
44 screw boss
51 operable plate
53 shaft bolt
54 engagement pin
59 engagement hole

What is claimed is:

1. A handle assembly for a power tool comprising:
a mounting member configured to be attached to a tool body of the power tool;
a handle having (i) a grip configured to be gripped by a user of the power tool when the handle assembly is attached to the tool body and (ii) an arm configured to be attached to the tool body by the mounting member such that the arm is selectively rotatable with respect to the tool body;
an operation member supported by the mounting member and selectively engageable with the arm; and
a biasing member; wherein:
the arm, the operation member and the mounting member are configured such that the operation member is movable relative to the mounting member between first and second positions;
the biasing member is configured to bias the operation member to the second position;
the arm is rotatable relative to the mounting member and the operation member when the operation member is in the first position;
the arm cannot rotate relative to the mounting member and the operation member when the operation member is in the second position; and
the operation member and the biasing member are configured such that the operation member can be moved from the second position to the first position by a force overcoming the biasing force and the operation member returns to the second position when the force ceases.

2. The handle assembly according to claim 1, wherein:
the operation member has a central longitudinal axis; and
the operation member and the mounting member are configured such that the operation member can move along the central longitudinal axis between the first and second positions.

3. The handle assembly according to claim 1, wherein the operation member and the mounting member are configured such that the operation member cannot rotate relative to the mounting member when the operation member is supported by the mounting member.

4. The handle assembly according to claim 3, wherein:
the operation member includes a first engagement surface;
the mounting member includes a second engagement surface; and
the first engagement surface and the second engagement surface abut to preclude rotation of the operation member relative to the mounting member.

5. The handle assembly according to claim 1, wherein:
the handle includes a pair of the arm;
one of the pair of the arm is configured to be attached to a first side surface of the tool body;
a second of the pair of the arm is configured to be attached to a second side surface of the tool body; and
the first and second side surfaces are opposite side surfaces of the tool body.

* * * * *